Figure 3:
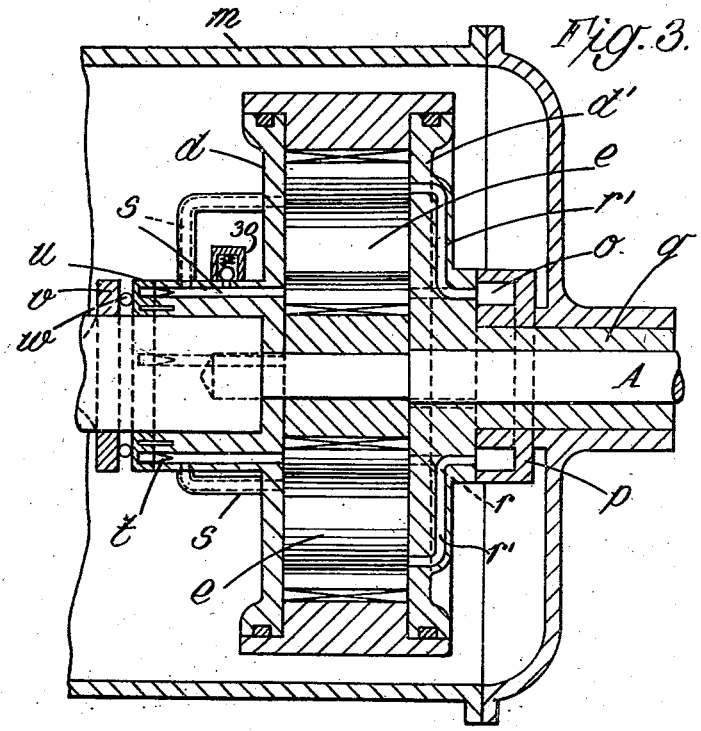

Feb. 16, 1943. W. H. N. LOVEDAY 2,311,237
HYDRAULIC EPICYCLIC TRANSMISSION DEVICE
Filed Aug. 13, 1940 3 Sheets-Sheet 1
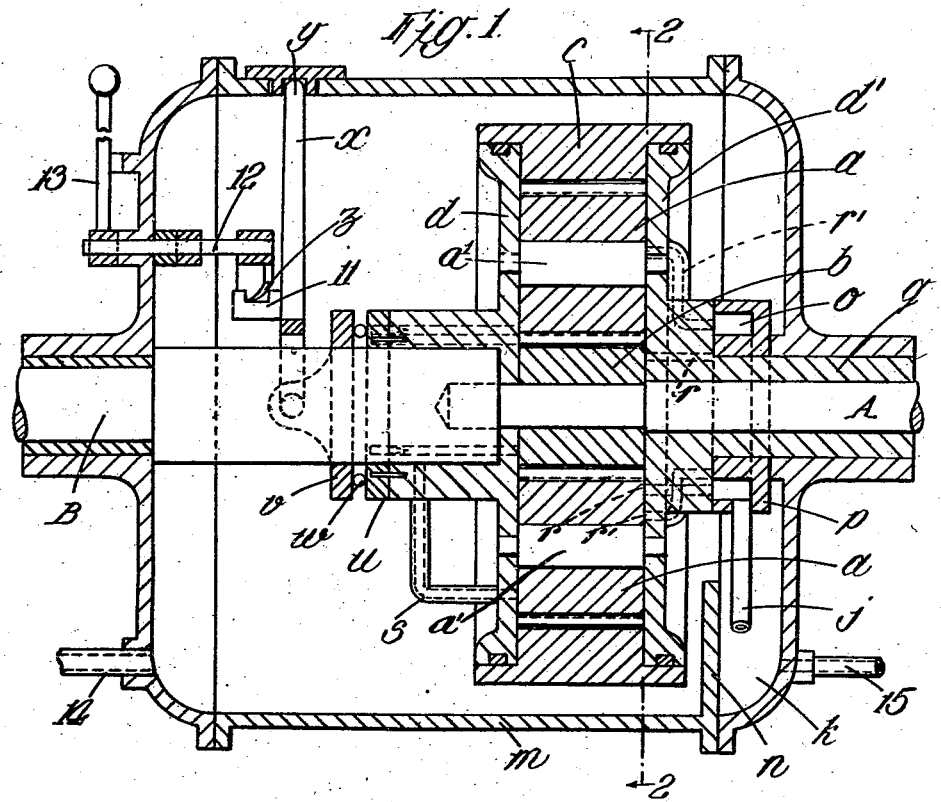
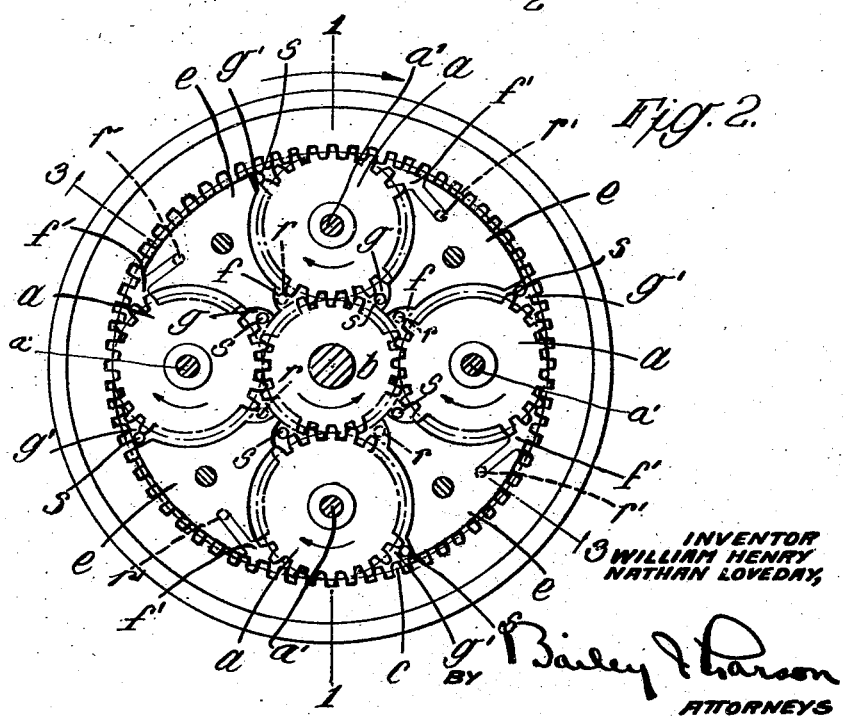
INVENTOR
WILLIAM HENRY
NATHAN LOVEDAY,
BY Bailey & Parson
ATTORNEYS Feb. 16, 1943. W. H. N. LOVEDAY 2,311,237
HYDRAULIC EPICYCLIC TRANSMISSION DEVICE
Filed Aug. 13, 1940 3 Sheets-Sheet 3
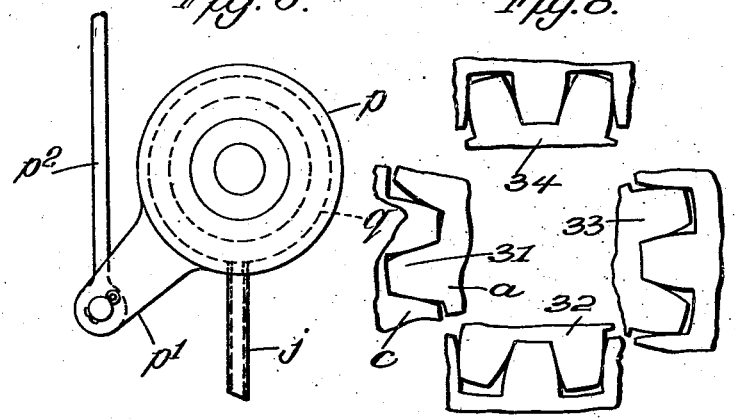
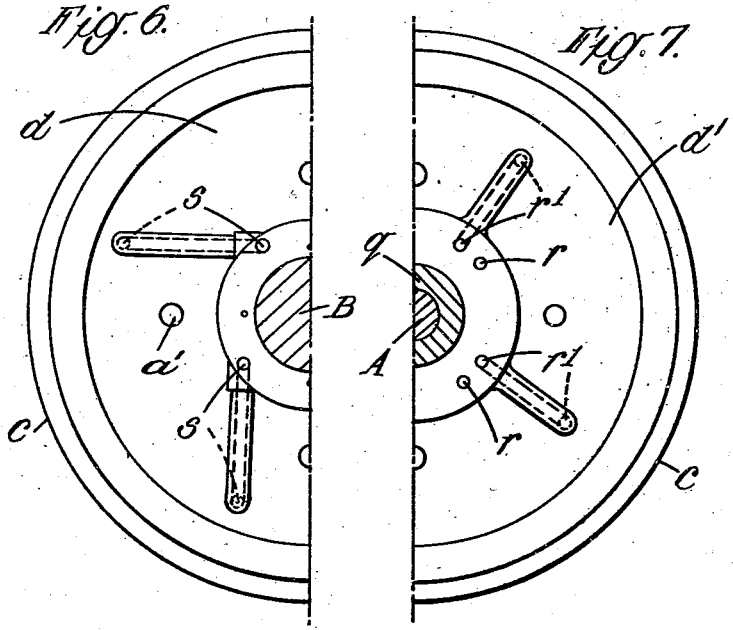
INVENTOR
WILLIAM HENRY NATHAN LOVEDAY,
BY Bailey, Stephens & Huettig
ATTORNEYS Patented Feb. 16, 1943

2,311,237

UNITED STATES PATENT OFFICE 2,311,237

HYDRAULIC EPICYCLIC TRANSMISSION DEVICE

William Henry Nathan Loveday, Aldbourne, Marlborough, England

Application August 13, 1940, Serial No. 352,473
In Great Britain October 11, 1939

4 Claims. (Cl. 192—61)

This invention relates to an hydraulic epicyclic transmission device of the type comprising a sun wheel, planet wheels, a carrier for said planet wheels, and outside ring gear, in which the relative motion of the various parts (and hence the gear ratio of the transmission device) is controlled by regulation of the flow of a working fluid, such as oil, within the device. It is known to construct the planet carrier in the form of two discs concentric with the sun wheel and on either side thereof and carrying bearings for the ends of the spindles on which the planet wheels revolve; whilst those parts of the annular space between the sun wheel and the ring gear not occupied by the planet wheels are filled by blocks secured to the discs of the planet carrier and each shaped with an inlet and an outlet passage constituting feed and compression chambers respectively so that the sun wheel and each planet pinion may act as a gear pump and draw working fluid from the inlet passage and pump it through the outlet passage, against a resistance depending on the setting of an outlet valve under the control of an operator.

It is an object of the invention to minimise the wear undergone by parts such as the spindles of the planet pinions.

The present invention comprises an hydraulic transmission device of the type described, having a number of blocks secured to, and between, the discs of the planet carrier and each bounded by the outside gear ring, two planet pinions and the sun wheel, wherein each block is formed with four cut-back portions to constitute, together with adjacent gear wheels, two feed chambers and two compressions chambers oppositely arranged, the effective angular extent of which is such that the forces set up upon the rotary pinions by the working fluid within the feed and compression chambers of the device as a whole are substantially equal and act in opposition, as, in relation to any planet pinion, to the sun wheel and to the gear ring, the feed chambers are substantially opposite one another, as also are the compression chambers and thus wear of the spindles and teeth of the planet pinions, the sun wheel and the gear ring and of the walls of the blocks traversed by the gear teeth is reduced.

To reduce noise, the planet pinions may be equally spaced with an odd number of teeth on the sun wheel and/or gear ring; or the planet pinions may be unequally spaced, with an even number of teeth on the sun wheel and/or gear ring. The planet pinions may have either an odd or an even number of teeth. The engagement of the planet pinions with the gear ring and/or with the sun wheel is asynchronised; that is to say the engagement of the teeth of the respective planet wheels with the gear ring and/or sun wheel is such that at no time are the teeth of more than one planet wheel in a mid-position of engagement with the gear ring and/or sun wheel, as the case may be, thus effecting a more continuous transmission of power.

Figure 4:
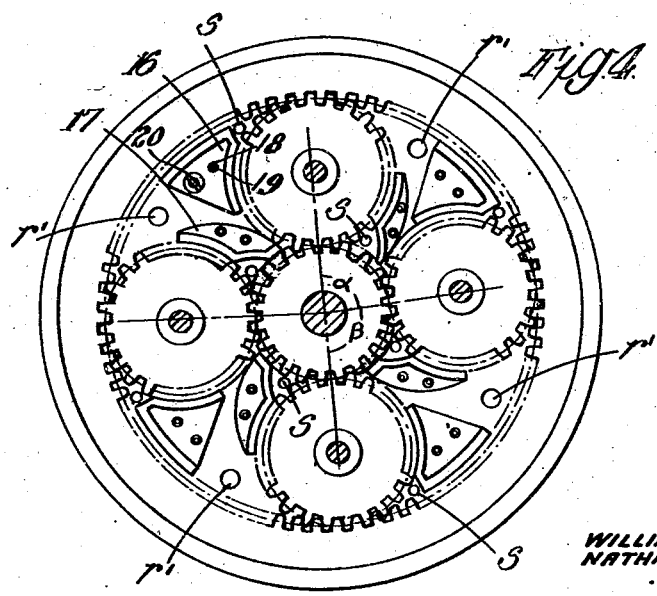

The accompanying diagrammatic drawings serve to illustrate the invention, Figure 1 being a sectional elevation of one form on the line 1—1, Figure 2; Figure 2 a sectional elevation on the line 2—2, Figure 1; Figure 3 a sectional elevation on the line 3—3, Figure 2; Figure 4 a sectional elevation corresponding with Figure 2 but showing a modification of the invention; Figure 5 is an end view of a detail; Figures 6 and 7 are sectional side elevations of other details, and Figure 8 is a detail fragmentary showing the engagement of the teeth.

As shown in Figures 1, 2 and 3 an hydraulic transmission device of the type described has a driving shaft A, a driven shaft B and four planet pinions $a$ . . . equally spaced around the sun wheel $b$ keyed to shaft A, and within a gear ring $c$ having an odd number of teeth. Secured to two discs $d$, $d'$ constituting the planet carrier are four metal blocks $e$ . . . the edges of which are just clear of the tips of the teeth of wheels adjacent thereto. The disc $d$ is keyed to the shaft B and both discs $d$, $d'$ are secured together with the blocks $e$ . . . so that they all rotate as a unitary structure. The discs $d$, $d'$, side elevations of which are shown in Figures 6 and 7 respectively, carry bearings for the ends of spindles $a'$ . . . for said planet pinions $a$ . . . The ring gear $c$ is rotatably mounted on the outside of rings $d$, $d'$. Each block $e$ is cut back at its corners so that four chambers such as $f$, $f'$ and $g$, $g'$ are formed between the block $e$, a planet pinion $a$, and either the sun wheel $b$ or gear ring $c$. These chambers are oppositely arranged in pairs, the chambers $f$, $f'$ being feed chambers, and the chambers $g$, $g'$ being compression chambers. There are thus eight chambers, $f$, $g$, alternately feed and compression, between the sun wheel $b$ and planet pinion $a$ . . ., and eight more chambers, $f'$, $g'$ alternately feed and compression, between the gear ring $c$ and the planet pinions $a$ . . . A feed chamber $f$ in the series of chambers around the sun wheel $b$ feeds the adjacent chamber $g'$ in the gear ring series in a radial direction and also the adjacent chamber $g$ in the sun wheel series in a circumferential direction.

Similarly a feed chamber $f'$ in the gear ring series feeds the adjacent chamber $g$ in the sun wheel series in a radial direction and also the adjacent chamber $g$ in the ring series in a circumferential direction, the circumferential direction being the direction of rotation of the sun wheel $b$ or the ring $c$ as the case may be.

The feed to the chambers $f$, $f'$ is by way of a pipe $j$ which dips into a sump $k$ formed in the casing $m$ of the device by a partition $n$, said pipe $j$ leading to an annular passage $o$ in a sleeve $p$ carried by a combined bearing and journal $q$ forming part of one of the discs $d$. The disc $d'$ is journalled in the casing $m$ to provide a support at one end of the driven structure $d$, $d'$, $e$ and at the same time provide a bearing for the driving shaft A where it enters the casing $m$. This disc $d'$ is provided with passages $r$, $r'$ ... which lead from said annular passage $o$ to the feed chambers $f$, $f'$ respectively, whilst the other disc $d$ is provided with connecting passages $s$ ... have pipes $s'$ ... leading from compression chambers $g$ and $g'$ respectively. Passages $s$ have therein valves $t$ ... carried by an annular member $u$ acted upon by a pressure ring $v$ through a ball thrust bearing $w$, the pressure ring $v$ being operable through a lever $x$ pivoted at $y$, a cam $z$ engaging a grooved lug 11 on the lever $x$ and a spindle 12 on which are mounted the cam $z$ and an operating lever 13. The position at which the operating lever 13 is set determines the extent to which the valves $t$ ... may be opened by the pressure set up in the compression chambers $g$, $g'$ ... which pushes the valves toward open position and hence the gear ratio of the transmission device as a whole. If there be no pressure in the chambers $g$ and $g'$ when the driving shaft A is rotated, the gear ring $c$ rotates idly in relation to the discs $d$, $d'$. The complete closure of the passages $s$ ... may be effected by the valves $t$ ... themselves or by the adjacent face of the annular member $u$.

The sleeve $p$ is rotatable on the combined bearing and journal $q$ so that the pipe $j$ may be lifted out of the sump $k$ to provide neutral gear. For this purpose the sleeve $p$ is formed with a radial lug $p'$, see Figure 5, and connected with said lug $p'$ is a link $p^2$ which leads upwards and out through the casing $m$ and by means of which the sleeve $p$ may be displaced angularly on the combined bearing and journal $q$. The casing $m$ is provided with an outlet pipe 14 through which hot fluid may be withdrawn, led to a cooler (not shown) and returned to the system via a pipe 15 leading to the sump $k$.

The dimensioning of the chambers is determined by the peripheral area of the gear wheels exposed to the chambers, the peripheral area being chosen so as to cause the pressures exerted by opposed chambers (e. g. on the spindle of each planet pinion $a$) to counteract one another. That is to say that side of a feed chamber $f'$ of the ring series which is bounded by a planet pinion $a$ should be of the same angular extent as the side of the feed chamber $f$ of the sun wheel series which is bounded by the same planet pinion $a$ and a similar relationship exists between the compression chambers $g$ and $g'$ ... In other words, the distances along the periphery of a planet gear from the intersection of the addendum circles of the planet gear and of the sun and ring gears respectively to the other edge of the chambers are substantially equal.

As shown in Figure 8, the teeth of the planet wheels enter full engagement with those of the ring gear at different times. That is, teeth 31, 32, 33 and 34 have different degrees of engagement with the teeth of the ring gear.

The blocks $e$ ... may alternatively be formed of non-metallic substances such as synthetic resin compositions, and they may be made in relatively movable portions so that they can be adjusted relatively to adjacent gear wheels, and thus compensate for wear and maintain the optimum clearance.

For example, as shown in Figure 4, each block $e$ is in two parts 16, 17 and each of these parts has a flat portion or base by which it may be secured to an adjacent disc $d$, $d'$ and a curved flange or wall presented towards the adjacent sun wheel, planet pinion or gear ring, as the case may be. The connections through the bases of such parts with the adjacent disc $d$ or $d'$ may be such as to permit the relative adjustment above mentioned. For this purpose said flat portion or base is formed with holes 18 to give passage to screws 19 threaded in the discs and by which said parts 16, 17, may be secured to an adjacent disc $d$ or $d'$, said holes 18 being of larger diameter than the screws 19 to permit the required adjustment, while the heads 20 of the screws 19 clamp the flat portion or base against the disc $d$ or $d'$.

It is to be observed that when two part blocks 16, 17 are employed as shown in Figure 4 the space between the blocks of such a pair serves to establish connection between a feed chamber in the gear ring series and a feed chamber in the sun wheel series, hence the number of passages is halved, only those passages $r'$, for example, leading to the feed chambers of the gear ring (or sun wheel) series being retained.

In this form of the invention the planet pinions are arranged asymmetrically. For example, the angles $\alpha$ and $\beta$ in Figure 4 may be respectively less than and more than a right angle. The sun wheel in this form has an even number of teeth.

An auxiliary automatic one-way outlet valve 30 for the working fluid fitted in the fluid system between the high pressure chambers and the outlet valves may be provided to act as a safety valve in the event of a sudden overloading of the device.

I claim:

1. An hydraulic epicyclic transmission device comprising a sun wheel, planet wheels in mesh with said sun wheel, a carrier for said planet wheels and an internally toothed outside gear ring in mesh with said planet wheels, all said wheels and said carrier being mounted in a casing formed with bearings for a driving shaft and a driven shaft connected with said sun wheel and with said carrier respectively, said carrier being in the form of two discs concentric with said sun wheel and disposed on opposite sides thereof and carrying bearings for the ends of spindles for said planet wheels, the arrangement being such that spaces are formed between said gear ring and said planet wheels, blocks arranged in said spaces and secured to said discs, each of said blocks being bounded by said outside gear ring, two planet pinions and said sun wheel and being formed with cut-back portions constituting, together with adjacent gear wheels, oppositely arranged feed and compression chambers, so that the sun wheel and each planet pinion may act as a gear pump and draw fluid, from a source of supply within said casing, through a feed chamber and pump it through a compression chamber, said compression chambers having outlets and means for controlling the passage of fluid therethrough, said means being adapted to set up an adjustable resistance to the fluid pumped through said compression chambers.

2. An hydraulic eqicyclic transmission device comprising a sun wheel, planet wheels in mesh with said sun wheel, a carrier for said planet wheels and an internally toothed outside gear ring in mesh with said planet wheels, all said wheels and said carrier being mounted in a casing formed with bearings for a driving shaft and a driven shaft connected with said sun wheel, and with said carrier respectively, said carrier being in the form of two discs concentric with said sun wheel and disposed on opposite sides thereof and carrying bearings for the ends of spindles for said planet wheels, the arrangement being such that spaces are formed between said gear ring and said planet wheels, blocks arranged in said spaces and secured to said discs, each of said blocks being bounded by said outside gear ring, two planet pinions and said sun wheel and being formed with cut-back portions constituting, together with adjacent gear wheels, oppositely arranged feed and compresison chambers, so that the sun wheel and each planet pinion may act as a gear pump and draw fluid, from a source of supply within said casing through a feed chamber and pump it through a compression chamber, said compression chambers having outlets and means for controlling the passage of fluid therethrough, said means being adapted to set up an adjustable resistance to the fluid pumped through said compression chambers, said blocks being formed each in two parts.

3. An hydraulic epicyclic transmission device comprising a sun wheel, planet wheels in mesh with said sun wheel, a carrier for said planet wheels and an internally toothed outside gear ring in mesh with said planet wheels, all said wheels and said carrier being mounted in a casing formed with bearings for a driving shaft and a driven shaft connected with said sun wheel and with said carrier respectively, said carrier being in the form of two discs concentric with said sun wheel and disposed on opposite sides thereof and carrying bearings for the ends of spindles for said planet wheels, the arrangement being such that spaces are formed between said gear ring and said planet wheels, blocks arranged in said spaces and secured to said discs, each of said blocks being bounded by said outside gear ring, two planet pinions and said sun wheel and being formed with cut-back portions constituting, together with adjacent gear wheels, oppositely arranged feed and compression chambers so that the sun wheel and each planet pinion may act as a gear pump and draw fluid, from a source of supply within said casing, through a feed chamber and pump it through a compression chamber; said compression chambers having outlets and means for controlling the passage of fluid therethrough, said means being adapted to set up an adjustable resistance to the fluid pumped through said compression chambers, said blocks being formed each in two parts which are adjustably mounted.

4. An hydraulic epicyclic transmission device comprising a sun wheel, planet wheels in mesh with said sun wheel, a carrier for said planet wheels and an internally toothed outside gear ring in mesh with said planet wheels, all said wheels and said carrier being mounted in a casing formed with bearings for a driving shaft and a driven shaft connected with said sun wheel and with said carrier respectively, said carrier being in the form of two discs concentric with said sun wheel and disposed on opposite sides thereof and carrying bearings for the ends of spindles for said planet wheels, the arrangement being such that spaces are formed between said gear ring and said planet wheels, blocks arranged in said spaces and secured to said discs, each of said blocks being bounded by said outside gear ring, two planet pinions and said sun wheel and being formed with cut-back portions constituting, together with adjacent gear wheels, oppositely arranged feed and compression chambers, so that the sun wheel and each planet pinion may act as a gear pump and draw fluid, from a source of supply within said casing, through a feed chamber and pump it through a compression chamber, said compression chambers having outlets and means for controlling the passage of fluid therethrough, said means being adapted to set up an adjustable resistance to the fluid pumped through said compression chambers, said planet pinions being spaced in unequal angular relationship and the number of teeth on the sun wheel being an even number.

WILLIAM HENRY NATHAN LOVEDAY.